Figure 3:
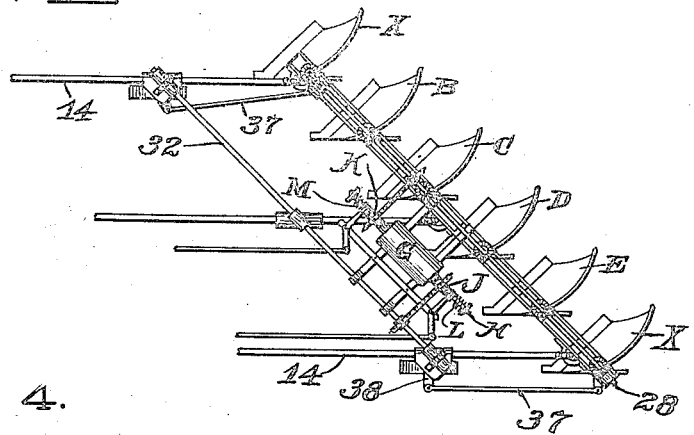

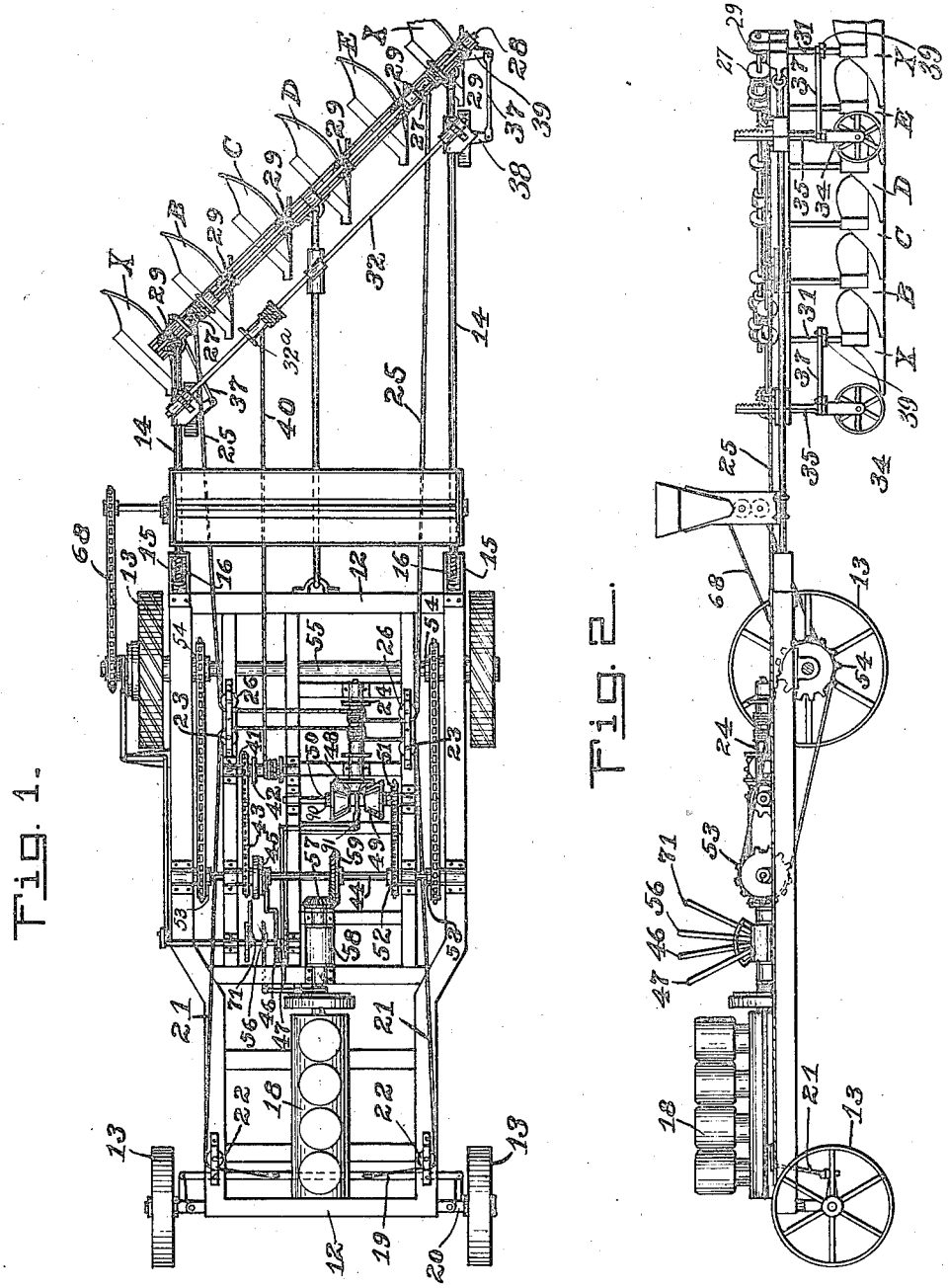

J. M. MALACOVE.
POWER DRIVEN AGRICULTURAL IMPLEMENT FOR PLOWING.
APPLICATION FILED DEC. 11, 1913.

1,222,647.

Patented Apr. 17, 1917.
2 SHEETS—SHEET 2.

Witnesses
George H. Moore.
Emil G. Hopp.

Inventor.
James M. Malacove.
By Reed & Cook.
Attorney.

UNITED STATES PATENT OFFICE.

JAMES M. MALACOVE, OF TACOMA, WASHINGTON.

POWER-DRIVEN AGRICULTURAL IMPLEMENT FOR PLOWING.

1,222,647.  Specification of Letters Patent.  Patented Apr. 17, 1917.

Application filed December 11, 1913. Serial No. 806,123.

*To all whom it may concern:*

Be it known that I, JAMES M. MALACOVE, a citizen of Bulgaria, and resident of the city of Tacoma, in the county of Pierce and State of Washington, have invented certain new and useful Improvements in Power-Driven Agricultural Implements for Plowing, of which the following is a full, clear, and exact description.

My invention relates to a novel and useful improvement in an agricultural implement for plowing. In general it has for its object the provision of a motor drive, propelling the machine and the associated mechanism that controls the plowing devices in such a manner as to render the motor advantageous and economical for agricultural usage. It further aims to accomplish a number of desired results, notably among which may be mentioned the feasibility of equipping an ordinary motor machine that has ceased to be useful for pleasure on the farm or elsewhere into the main power operating machine for the accompanying plowing equipment which can be attached thereto, thereby reducing the cost to a minimum, and at the same time making it feasible for the agriculturist to order and equip his old machine for the new duty of cultivating the soil.

In the drawings:

Figure 1 illustrates a plan view of my invention.

Fig. 2 side elevation with wheels removed.

Fig. 3 plan view of plows with motor for operating plows and depth gage.

Figure 4:
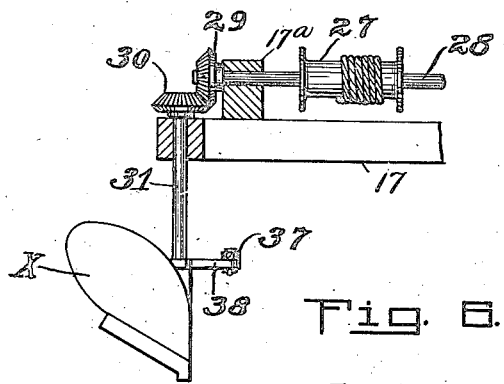

Fig. 4 enlarged sectional view of plow X.

Figure 5:
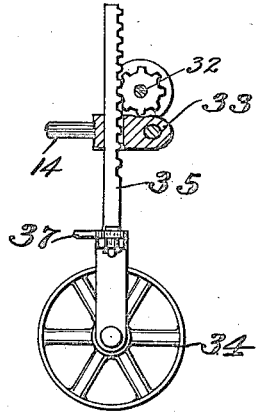

Fig. 5 enlarged section of depth gage.

Figure 6:
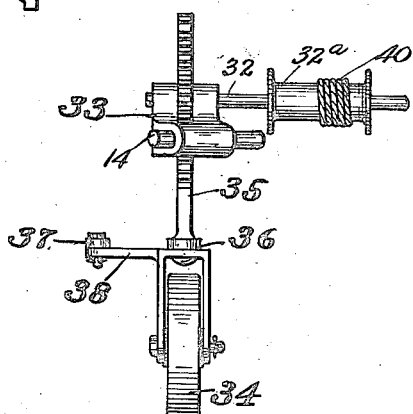

Fig. 6 rear view of depth gage.

In Fig. 1, 12 represents the supporting frame of my improved plowing machine mounted upon trucks 13. To the rear of said frame are two rods 14 adapted to be attached thereto by corresponding mountings 15 into which said rods protrude longitudinally and are held by springs 16 within said mounting which are adapted to encircle and hold said rods and impart a yielding movement to take care of sudden strains to which the rods and the accompanying mechanism is subjected. It is to be observed that one rod is longer than the other, and to their respective ends is loosely attached a connecting beam 17 for supporting the plows adapted to be adjusted thereunder. This beam is connected to the rods 14 in any well known manner.

Frame 12 carries at its front end the engine 18 that supplies the power to drive the machine and operate the communicating mechanism for manipulating the plows.

The front truck wheels 13 are mounted on swiveled shafts 20 connected by a rod 19 and secured to the connecting rod 19 of the swiveled front wheel shaft 20 is a cable 21 adapted to run through the pulleys 22 mounted on the side beam of the frame 12, and extending rearward and through the pulley 23 to the shaft 24 of the friction clutch where a frictional contact is made thereon, thence through corresponding pulleys and attached to the opposite position on the rod 19 of the forward wheel shaft 20. A similar cable 25 runs through opposite pulleys 26 and assumes the same relative position on the shaft 24 of the frictional clutch rearward of 21. The ends are attached with a frictional contact to pulleys 27, through which the supporting connecting shaft 28 extends. This shaft is adapted to be rotatably mounted upon the beam 17, and is provided with cog gearing 29 adapted to mesh with the cogs 30 on each of the respective plow shafts 31 as shown in Fig. 4.

For the purpose of elevating and lowering the plow, the shaft 32 is provided slightly forward and parallel to the one supporting the plows, and is mounted upon the rods 14 as shown in Fig. 6. Two wheel supports 34 are provided beneath the opposite ends of said rods having corresponding shaft gages 35 adapted to make swiveled joints 36 with and above the U shaped frame mounting of the wheels. These gage shafts protrude vertically through the mountings 33 and are serrated so as to mesh with cog mountings on the ends of the shaft 32. The U shaped frame mountings of the wheels 34 are correspondingly connected to the shafts 31 of the end plows by rods 37 pivotally engaging prongs 38 of the U shaped frame mountings of the wheels and similar prongs 39 of the shafts 31 of the end plows.

From the construction described it will be apparent that the cable 40 having a frictional contact on the pulleys $32^a$ of the shaft 32 and running forward, and likewise attached to a pulley on the shaft 41 and said shaft being equipped with a sprocket 42, and having power communicated thereto by sprocket and chain 43 on the shaft 44 which is provided with a clutch 45 and lever 46 therefor, the plows 18 can be elevated or lowered by applying power to the cable 40 which winds or unwinds on the pulley of the shaft 32, hence causing the shaft 32 to revolve. The direction in which said shaft is rotating will cause the cog mounted thereon to mesh with the serrated gage shafts 35 of the rear wheel supports 34 to move the same up or down in accordance with the direction desired.

The operation of the machine may be described as follows: The lever 56 operatively connected to the engine 18 controls the transmission of power from the power shaft from within the transmission cylinder 58. When said shaft is set in motion the cog 57 thereof meshes with the cog 59 of the transverse counter shaft 44, and thus communicates power thereby to the respective sprockets 53 which are connected to the driving shaft 55 by chains over sprockets 54 mounted thereon.

The rotation of the counter shaft 44 likewise imparts a driving force to the communicating mechanism that laterally shifts the plows. This is accomplished by the sprocket 52 mounted on said shaft communicating with the sprocket 51 mounted on the shaft 50 by chain which rotates a reversible bevel friction. This mechanism comprises two cones 49 with inclined faces fixedly secured to a collar 90 slidably movable in a key-way on the shaft 50. Rigidly attached to the collar 90 intermediate the cones 49 is an L shaped member 91 to which the lever 47 is attached for laterally shifting the reversible bevel friction along the shaft 50.

Disposed rearwardly at a point medial the inclined faces of the cones 49, is the cone 48 which is rigidly attached to the shaft 24 and adapted to frictionally mesh alternately with the cones 49. The contact of the cone 48 alternately with the cones 49 is effected by the lateral shifting of the reversible bevel friction by the lever 47. The direction of lateral movement of the reversible bevel friction predetermines which one of the cones 49 is to have contact with the cone 48, hence predetermining the direction of rotation of the shaft 24 which controls the shifting of the plows.

To neutralize the position of the reversible bevel friction the result is attained by centrally locating it by the lever 47 in the slide way on the shaft 50 so that the respective faces of the cones 49 will be equidistant from the faces of the cone 48.

It can be clearly seen that a clutch (not shown) could be attached to the shaft 44 to render idle the driving mechanism of the reversible bevel friction if desired. The application of that principle is shown by the clutch 45 mounted on the shaft 44 and controlled by the lever 46 for actuating the mechanism for elevating the plows, the same power being deliverable through the rotation of the counter shaft 44 by the communicating mechanism with the engine.

It will be understood that numerous changes in the form and arrangement of the various parts embodied in the machine may be resorted to without departing from the spirit of the invention or sacrificing any of its advantages.

This friction cone is mounted on a shaft 50 having a sprocket 51 communicating by a chain with a sprocket 52 on the shaft 44. This shaft is connected by two large sprockets 53 communicating by chains with sprockets 54 mounted on the rear driving shaft 55 of the main machine to drive the wheels.

Power to drive the machine and the associated plow mechanism is derived from the motor 18. The shaft thereof extending within the transmission cylinder 58, is provided with a cog 92 which meshes with the cog 59 mounted on the transverse countershaft 44. The lever 56 operatively connected to said motor provides the means for imparting rotary motion to the shaft extending within the transmission cylinder from whence power is communicated through the associated mechanism to drive the machine and operate the plows as above described.

The turning of the forward wheels 13 will cause the cable 21 to impart through the friction pulley shaft 24 a pulling or releasing action by the rear cable 25 which instantly winds or unwinds on the pulleys mounted on the connecting shaft and hence shifts the plows by the cog gearing in the direction indicated by the forward truck wheels.

A further mechanism for shifting and elevating the plows is illustrated in Fig. 3. G, represents a motor mounted upon a frame constructed between shafts 32 and connected by wires with a generator on the forward truck. The shaft H of this motor is provided with sprocket clutches J and K adjusted with springs L and M. These sprocket gears perform the same function as the respective cables 25 and 40 of Fig. 1.

Having fully described my invention what I claim as new and desire to protect by Letters Patent is:

1. An agricultural implement comprising in combination with a truck and a motor, a rear frame adapted to be yieldingly connected to said truck, said frame provided with a rearwardly and laterally inclined transverse shaft rotatably attached thereto, said shaft provided with a plurality of gears, a plurality of vertical shafts adapted to mesh at their upper ends with the gears of said transverse shaft, plows detachably mounted on the lower ends of said vertical shafts, means connected to said frame for elevating said plows, a forward shaft on said rear frame adapted to engage said plow elevating means, means communicating with said forward shaft from said motor and means communicating with said rearwardly and laterally transverse shaft from said motor whereby said plows can be elevated by said first communicating means and laterally shifted by said last named communicating means.

2. An agricultural implement comprising in combination with a truck and a motor, a rear frame consisting of side rods and a transverse end beam attached thereto, said frame being yieldingly connected to said truck, a shaft rotatably mounted upon said transverse beam and provided with a plurality of gears, a plurality of vertical shafts provided with gears on their upper ends that mesh with the gears of said transverse shaft, plows mounted upon the lower ends of said vertical shafts, a forward transverse shaft, a wheel support for said plows having a rack and pinion engagement with said forward transverse shaft, a reversible bevel friction and a shaft therefor, forward truck wheels, forward and rearward cables wound upon the shaft of said reversible bevel friction approximately at their centers the ends of said forward cable extended forward and adapted to be connected respectively to said shaft of the forward truck wheels, the ends of said rearward cable extended rearward in the same manner and wound upon the rear transverse shaft, a transverse shaft in the plane of said reversible bevel friction and a counter shaft for said motor, an intermediate cable one end of which is wound upon the said forward transverse shaft the other end wound upon said transverse shaft in the plane of said reversible bevel friction, said last named shaft having sprocket and chain engagement with the counter shaft of said motor, the said reversible bevel friction having sprocket and chain engagement with the counter shaft of said motor, whereby said plows can be elevated and lowered and whereby the points of said plows can be laterally shifted.

3. An agricultural implement comprising in combination with a truck frame and a motor, a rear frame attached to said truck frame, a transverse beam comprising the rear end of said rear frame, a transverse rear shaft mounted upon said beam, vertical shafts supported by said beam and engaging with said rear transverse shaft, plows attached to said vertical shafts, a forward transverse shaft, a wheel support for said plows having a rack and pinion engagement with said forward transverse shaft, means connecting said wheel support with the respective vertical shafts of said plows, a reversible bevel friction and a shaft therefor, forward and rearward cables wound upon said shaft of said reversible bevel friction approximately at their centers the ends of said forward cable connected to the shaft of the forward truck wheels and the ends of the rearward cable wound upon said transverse rear shaft, an intermediate cable, a transverse shaft in the plane of said reversible bevel friction, the ends of said intermediate cable wound upon said forward transverse shaft and said last named shaft, a counter shaft, means operatively connecting said counter shaft with said reversible bevel friction and means operatively connecting said counter shaft with the transverse shaft in the plane of said reversible bevel friction, shifter means for operating said reversible bevel friction and clutch operative means for actuating said plow lifting mechanism.

Signed by me at Seattle, Washington, this 3rd day of November, 1913.

JAMES M. MALACOVE.

Witness:
M. A. BUTLER.